United States Patent [19]

Blumel et al.

[11] Patent Number: 5,540,907
[45] Date of Patent: Jul. 30, 1996

[54] PROCESS FOR PREPARING HIGH SOLIDS CONTENT TITANIUM DIOXIDE SUSPENSION WITH A DECHLORINATING AGENT

[75] Inventors: Siegfried Blumel, Ratingen; Achim Hartmann, Pulheim; Hans Thumm, Leverkusen; Hans-Hermann Luginsland, Leverkusen; Franz Rosendahl, Leverkusen, all of Germany

[73] Assignee: Kronos, Inc., Hightstown, N.J.

[21] Appl. No.: 380,317

[22] Filed: Jan. 30, 1995

Related U.S. Application Data

[63] Continuation of Ser. No. 91,341, Jul. 12, 1993, abandoned.

[30] Foreign Application Priority Data

Jul. 22, 1993 [DE] Germany .......................... 42 24 149.9

[51] Int. Cl.$^6$ .................................................. C01G 23/00
[52] U.S. Cl. ............................................ 423/610; 106/436
[58] Field of Search .................................. 423/610, 613, 423/611, 612, 614; 106/437, 436, 447, 448

[56] References Cited

U.S. PATENT DOCUMENTS

| | | | |
|---|---|---|---|
| 2,819,176 | 1/1958 | Vartanian ................................. | 106/436 |
| 4,225,564 | 9/1980 | Tolley ..................................... | 423/610 |
| 4,280,849 | 7/1981 | Howard et al. .......................... | 106/449 |
| 4,355,015 | 10/1982 | Heckel et al. .......................... | 423/613 |
| 4,784,841 | 11/1988 | Hartmann et al. ...................... | 423/613 |

FOREIGN PATENT DOCUMENTS

| | | | |
|---|---|---|---|
| 780512 | 3/1968 | Canada ................................... | 106/436 |
| 590323 | 1/1978 | U.S.S.R. ................................. | 106/436 |

*Primary Examiner*—Steven Bos
*Attorney, Agent, or Firm*—Michael J. Cronin

[57] ABSTRACT

In the preparation of a suspension with a high content of titanium dioxide, which has been produced according to the chloride process, a finely divided titanium dioxide is slurried, in unflocculated condition without use of a dispersing agent, dechlorinated and then filtered. The content of multivalent anions can be controlled in the slurry before the filtration through suitable dechlorinating agents, particularly hydrogen peroxide and/or sodium hydrogen sulfite, and thereby the solid content in the filter cake and the consistency of the filter cake are advantageously influenced. If, on one hand, no or only few multivalent anions are present, a thixotropic filter cake with a high solids content is obtained in a pressure filtration. The filter cake is converted into a titanium dioxide suspension with a high solids content through feeding into a titanium dioxide suspension to which a dispersing agent has been added. If, on the other hand, a rigid filter cake is desired by, for example, a vacuum filtration, a minimum quantity of multivalent anions is necessary for the formation of the rigid filter cake. The solids content is, however, lowered in comparison to the thixotropic filter pastes. Where this minimum quantity of multivalent anions is exceeded, the solids content declines further. The rigid filter cakes can be rendered flowable through the direct admixing of dispersing agent. Hydrogen peroxide is particularly preferred as a dechlorinating agent.

7 Claims, No Drawings

PROCESS FOR PREPARING HIGH SOLIDS CONTENT TITANIUM DIOXIDE SUSPENSION WITH A DECHLORINATING AGENT

This application is a continuation of application Ser. No. 08/091,341, filed on Jul. 12, 1993 now abandoned.

This application is related to a patent application Ser. No. 08/091,342 now U.S. Pat. No. 5,393,510, filed contemporaneously by the same inventors for HIGH SOLIDS CONTENT TITANIUM DIOXIDE SUSPENSION.

BACKGROUND AND SUMMARY

The present invention relates to a titanium dioxide suspension with high solids content and to a process for the preparation thereof, and more particularly, to a process in which dryly precipitated finely divided titanium dioxide is slurried in an aqueous liquid, chlorine and reducible chlorine compounds formed in the slurry are reduced through addition of a dechlorinating agent or a combination of dechlorinating agents, the titanium dioxide is separated by filtration and the filter cake (or "paste") is then made flowable by use of a dispersing agent.

U. S. Pat. No. 4,280,849 teaches that the solid content of a titanium dioxide suspension can be raised by using a filter cake with the highest solids possible. The patent describes first dewatering the starting titanium dioxide slurry by filtration, the filter cake obtained in a first filtration step is then mixed with such a quantity of dispersing agent that a liquefaction occurs and the free flowing suspension obtained thereby is dewatered with use of a pressure filter in a second filtration step. The filter cake obtained is described as preferably homogenized with a second dispersing agent in a mixing apparatus. The process is complicated and costly. Also, high applied pressures are required in the second filtration step.

According to the process described in U.S. Pat. No. 4,978,396, a titanium dioxide pigment slurry prepared with the aid of a first dispersing agent in unflocculated condition is dewatered by pressure filtration and the filter cake is made flowable with the addition of a second dispersing agent. Contingent upon the first dispersing agent, there is significant filtration loss in the filtration. A cloudy filtrate is obtained and requires complicated and costly processing.

The process according to the present invention has an object to reduce or minimize the content of multivalent anions in the titanium dioxide aqueous slurry through the addition of a dechlorinating agent or a combination of dechlorinating agents in a certain way. The invention involves the recognition that obtaining a final high solids content in the filtration is connected with the chlorine content of the starting slurry. In particular it has been found that, the amount of multivalent anions has a decisive influence on the solids content of the filter cake and the resultant suspension and that there are especially favorable concentration ranges for achieving the highest possible solids content in the filter cake.

The discovery that too high a content of multivalent anions leads to a filter cake with a lower solids content can be further expanded to a further conclusion that, in addition to the dechlorinating agent, the filtration process can also have an important influence on the amount of attainable solids in the filter cake. Thus, in addition to the content of multivalent anions, the techniques of the filtration process used are important.

The present invention uses as the starting material largely untreated titanium dioxide prepared for example through the reaction of titanium tetrachloride with an oxygen-containing gas in a reactor utilizing the well known chloride process for manufacturing titanium dioxide. After passing through a cooling zone, the titanium dioxide is separated dry from the reaction mixture and is slurried in water without the use of a dispersing agent. As a rule, the slurry becomes acidic as a consequence of the acidic components of the titanium dioxide.

For purposes of subsequent processing, the slurry must be "dechlorinated". Although efforts are made in the chloride manufacturing process to separate chlorine in the precipitate of titanium dioxide, some chlorine normally sticks or clings to the finely divided titanium dioxide. In the following description, "chlorine" should be understood to include both solvated chlorine as well as reducible chlorine compounds, particularly hypochlorites, which are formed in the slurry. Similarly, "dechlorinating agent" is to be understood to include, not only one chemical substance, but also a combination or mixture of several dechlorinating substances. The dechlorinating agent is generally added in the form of an aqueous formulation.

The present invention involves the conclusion that a relationship exists to such an extent that the higher the content of multivalent anions in the slurry destined for filtration, the smaller will be the solids content of the filter cake obtainable in the filtration, and that the solids content percentage approaches a lower limit asymptotically. A similar relationship has also been observed in the case of univalent anions, although this relationship is far less pronounced than that for multivalent anions.

In conventional processes for manufacturing titanium dioxide, the multivalent anions are largely introduced into the slurry by the dechlorinating agent. It is, therefore, especially preferred according to the present invention to use a dechlorinating agent which does not increase the content of multivalent anions in the suspension. A suitable substance has been found to be hydroxylammonium chloride and especially preferred is hydrogen peroxide.

It is further understood that for particular filtration processes it is advantageous to combine one of the aforementioned dechlorinating agents with a second dechlorinating agent which introduces multivalent cations into the suspension thereby to control the content of multivalent anions.

According to a specific embodiment of the process of the present invention, a combination of hydrogen peroxide and sodium hydrogen sulfite with use of Moore filtering has proved effective. If hydrogen peroxide as well as sodium hydrogen sulfite are used as the dechlorinating agents, preferably the hydrogen peroxide addition should take place before the addition of sodium hydrogen sulfite.

Besides the content of multivalent anions, the amount of solids content obtainable also depends somewhat on the filter used and the consistency of the filter cake depends on its solids content. Surprisingly, filter cakes with a relatively low solids content (e.g. below 60%) become rigid, and are not liquefied under the influence of low shearing forces without addition of a dispersing agent. They therefore do not readily flow away from the filter under the influence of shearing forces. Such a filter cake is designated as a "rigid filter cake."

Filter cakes with a high solids content show a behavior similar to thixotropic substances. Such filter cakes become promptly fluid under the influence of low shearing forces as occur, for example, in attempts to remove the cake from cloth filters and do so often in the absence of dispersing agents. In contrast to a genuine thixotropic substance, however, the liquid condition does not revert back again into the rigid state after suspension of shearing forces. Notwithstanding the difference with genuinely thixotropic substances, such a filter cake is designated as "thixotropic filter cake."

For filter cakes with differing consistency, varied methods must be taken to convert the filter cake into a highly concentrated titanium dioxide suspension. If an anionic dispersing agent is directly added in a thixotropic filter cake, it almost promptly become rigid and only after rather long kneading can the initially unstirrable mass be converted into a liquid suspension.

In contrast to the thixotropic filter cake, it is not critical with a rigid filter cake how it is combined with the dispersing agent. As a rule it suffices to pour the dispersing agent onto the filter cake and stir. With a thixotropic filter cake, the filter cake can be stirred into a dispersing agent in small portions with shearing forces and, since thixotropic filter cakes already have a rather high solids content, a titanium dioxide suspension with a rather high solids content is thus obtained. It is especially preferred to bring the thixotropic filter cake into an anionically dispersed titanium dioxide suspension in which the added required dispersing agent has been previously dispersed.

As filtration equipment for the operation with thixotropic filter cakes, a pressure filtration apparatus, particularly a membrane filter press, is suitable. How high the content of multivalent anions can be and still permit a thixotropic filter cake to form depends, among other things, on the temperature and the titanium dioxide content of the slurry. As a standard limiting value, the content of multivalent ions appears to lie below about $3 \times 10^{-3}$ mol/liter.

If the dewatering is carried out on a Moore filter, which is widely used in the titanium dioxide industry, instead of with a pressure filter, the altered requirement profile of the filtration behavior should be considered and the dechlorination modified, if necessary. Thixotropic filter cakes cannot normally be handled under operating conditions with Moore filtration equipment. For the formation of a manageable rigid filter cake, a minimum quantity of multivalent ions is required. In such case a rigid filter cake is formed from the dechlorinated slurry, and made flowable via mixing with a dispersing agent with application of shearing forces. A filter cake obtained in a vacuum filtration, however, generally has a lower solids content than a thixotropic filter cake obtained by pressure filtration as previously described. The solids content of a suspension can be further increased if a part of the suspension is dried in a spray drier. This spray-dried material is mixed into the suspension, and the mixture obtained thereby can be then ground.

In vacuum filtration, particularly on Moore filters, it has been found that too many multivalent anions can be carried into the slurry in the dechlorination and lead to a lowering of the solids content of the filter cake. On the other hand, however, an order of magnitude of approximately $5 \times 10^{-3}$ mol/l of such multivalent anions must be present so that a rigid filter cake can be formed, a requirement for being able generally to carry out the process on an industrial scale. The present invention checks the content of multivalent anions in the slurry or recognizes that in the dechlorination step the content of the multivalent anions climbs to about $5 \times 10^{-3}$ mol/l, but still assures that not more than the absolutely essential required number of multivalent anions is added. By controlling the dechlorination with regard to the content of multivalent anions in the slurry, the surprising result has been discovered and the preparation of a highly concentrated titanium dioxide suspension is optimized. It is to be understood that in the slurry attention should be paid to keeping the quantity of chlorine adhering to the titanium dioxide low so that the quantity of dechlorinating agent can be as small as possible.

Through the selection of dechlorinating agent and taking into account the filtration process used and the residual chlorine, the solids content in the filter paste can be controlled so that in the differing filtration processes used on an industrial scale, the maximum possible solids content in the filter cake can be obtained.

In the transformation of the filter cake into a flowable suspension, dispersing agents are used in a quantity of 0.1 to 5% (wt.) based on the solids content of the filter cake. Substances from the groups of the alkali polyphosphates, substituted aliphatic carboxylic acids, their alkali salts and acid salts, polyacrylic acids and their alkali salts as well as polyalcohols and aminoalcohols are suitable. As a rule, the suspension with a high solids content is subsequently ground. A sand mill or pearl mill is preferably used for the grinding operation.

A substantial advantage of the process according to the present invention is the economical preparation of a suspension with a high titanium dioxide content. It is understood that the high solids-containing filter cake can indeed also be subsequently processed to a titanium dioxide pigment for industrial uses. Dewatering in the filtration, which according to the present invention is controlled via the dechlorination, improves the efficiency of the suspension preparation.

The solids content of the suspension of particularly finely dispersed titanium dioxide can amount to 78 weight percent and more. The titanium dioxide suspension shows outstanding industrial processing properties and, in the ease of processing to titanium dioxide pigments, outstanding commercial pigment properties. It is stable and capable of being transported and stored. Such suspensions are particularly required for the preparation of paper.

DETAILED DESCRIPTION OF THE INVENTION

These and other objects, features and advantages of the present invention will become more apparent from the following detailed description thereof in which the influence of the dechlorination and the filtration process on the solids content of the filter cake is demonstrated by the following examples.

All the following examples originate with slurried titanium dioxide which had been deposited at the end of a cooling stage in the chloride titanium dioxide process and the coarse portion had been deposited via wet sieving on a sieve with a mesh aperture of 0.16 mm. EXAMPLE 1

The concentration of the aqueous slurry in this example amounted to 509 g/l titanium dioxide, and the pH was 3.6. It had been determined analytically that, for the reduction of chlorine or reducible chlorine compounds present in the slurry, an equivalent C (½ $Cl_2$) of $12 \times 10^{-3}$ mol/l of dechlorinating agent was required. The content of multivalent anions in the still undechlorinated slurry was below $1 \times 10^{-3}$ mol/l.

Corresponding to the data given in Table 1 below showing Experiments 1 through 9 the slurry was completely or partially dechlorinated with sodium hydrogen sulfite solution and/or a corresponding quantity of 30% hydrogen peroxide solution. The completely or partially or undechlorinated slurry was filtered using laboratory suction filters. The consistency and the solids content of the filter cake obtained are reported in Table 1.

EXAMPLE 2

Here the concentration of the slurry amounted to 500 g/l titanium dioxide. Sodium hydrogen sulfite was used as dechlorinating agent. The dechlorination requirement, calculated as an equivalence concentration C (½ $Cl_2$), amounted to $14\times10^{-3}$ mol/l. The results obtained with a full or partial dechlorination and a Moore filtration (filter area 2.16 $m^2$; vacuum about 500 m bars) are reported in Table 2 for Experiments 10 through 14.

With increasing quantities of sodium hydrogen sulfite, the solids content in the filter paste decreased from 71 to 61%.

EXAMPLE 3

Partial quantities were withdrawn from a slurry with a titanium dioxide content of 510 g/l and a dechlorination requirement, calculated as equivalence concentration C (½ $Cl_2$), of $10\times10^{-3}$ mol/l and the dechlorination requirement increased through introduction of chlorine gas. (See Table 3 for the results obtained). The pH in all experiments was at or below 4. All suspensions are dechlorinated with the same "base requirement" of the slurry not further chlorinated. The increased dechlorination requirement was leveled out before the addition of sodium hydrogen sulfite through the appropriate quantities of hydrogen peroxide. Irrespective of the dechlorination requirement, a filter paste with identical solids content was obtained. All filter cakes were rigid and were dispersed without problems through the direct addition of a dispersing agent (polyacrylate) and proved satisfactory.

EXAMPLE 4

This example involved a slurry with a titanium dioxide content of 564 g/l, a pH of 3.8 and a dechlorination requirement, calculated as equivalence concentration C (½ $Cl_2$)= $14\times10^{-3}$ mol/l hydrogen peroxide and $5\times10^{-3}$ mol/l sodium hydrogen sulfite and filtered on a Moore filtration apparatus. The filter paste had a solids content of 65%. A part of the paste was made flowable with 0.2% polyacrylate dispersing agent and 0.2% 2-amino-2-methylpropanol and spray dried (% details are based on $TiO_2$). Subsequently the filter paste was concentrated to a solids content of 72% titanium dioxide with the dry material while the filter paste was produced and as much dispersing agent been added that a content of polyacrylate dispersing agent of 0.4% and 2-amino-2methylpropanol of 0.2% in the concentrated solution ensued (% data-active material based on $TiO_2$). The suspension was ground in a 5 l sand mill with a capacity of 25 l/h; the viscosity of the suspension amounted to about 400 mPa.s.

EXAMPLE 5

This example involved a slurry containing 465 g/l titanium dioxide and with a dechlorination requirement, calculated as equivalence concentration C (½ $Cl_2$) of $2\times10^{-3}$ mol/l. Sodium hydrogen sulfite in the form of a 10% solution was added to reduce the chlorine.

The pH amounted to 2.8. The multivalent anion content in the slurry was under $3\times10^{-3}$ mol/l. 275 kg of this slurry were filtered on a membrane filter press with 4.5 $m^2$ filter area in 25 minutes at a final filter pressure of 4.2 bars. Thereafter, the filter cake was re-pressed for 15 minutes with the membrane at 6 bars.

121.6 kg of thixotropic filter cake with 77.5% dry substance were obtained. The filter cake was conveyed into a receiver, in which 150 kg of a flowable titanium dioxide suspension was located. This "receiver suspension" displays a solids content of 77.3% titanium dioxide. The suspension additionally contains 0.7% polyacrylate dispersing agent based on the total of titanium dioxide of the receiver and filter cake. No problems occurred with stirring. The filter cakes were dispersed without problems, and the suspension so prepared had excellent flowability.

For use in paper manufacturing the suspension was additionally treated with 0.2% 2-amino-2-methylpropanol and diluted with water to 73% solids content and finally ground in a sand mill with a capacity of 6.2 t/$m^3$h. Before grinding 0.1% of a defoamer was added. The sand-ground suspension was storage-stable, had a Brookfield viscosity of 400 mPa.s (100 rpm) and demonstrated outstanding properties of the type required for use in the paper manufacturing area.

TABLE 1

| | Suction filtration | | | |
| | | | Filter Cake | |
| Experiment | Dechlorination % | Reducing Agent | Solids Content % | Consistency |
| --- | --- | --- | --- | --- |
| 1 | 0 | — | 72 | strongly thixotropic |
| 2 | 100 | $H_2O_2$ | 72 | strongly thixotropic |
| 3 | 33 | $H_2O_2$ | 72 | strongly thixotropic |
| 4 | 66 | $H_2O_2$ | 72 | strongly thixotropic |
| 5 | 100 | $NAHSO_3$ | 62 | rigid |
| 6 | 33 | $NAHSO_3$ | 70 | thixotropic |
| 7 | 66 | $NAHSO_3$ | 65 | rigid |
| 8 | 100 | ⅔ $H_2O_2$; ⅓ $NAHSO_3$ | 70 | thixotropic |
| 9 | 100 | ⅓ $H_2O_2$; ⅔ $NAHSO_3$ | 66 | rigid |

TABLE 2

| | Filtration With a Moore Filter | | | |
| | $NAHSO_3$ - Addition | | Filter Cakes | |
| Experiment | mol/l | pH | Solids Content, % | Consistency |
| --- | --- | --- | --- | --- |
| 10 | $10^{-3}$ | 3.2 | 71 | strongly thixotropic |
| 11 | $3\times10^{-3}$ | 3.0 | 68 | slightly thixotropic |
| 12 | $5\times10^{-3}$ | 2.9 | 65 | rigid |

TABLE 2-continued

Filtration With a Moore Filter

| Experiment | NAHSO$_3$ - Addition mol/l | pH | Filter Cakes Solids Content, % | Consistency |
|---|---|---|---|---|
| 13 | $6 \times 10^{-3}$ | 2.9 | 63 | rigid |
| 14 | $7 \times 10^{-3}$ | 3.0 | 61 | rigid |

TABLE 3

Filtration of Suspension with Increasing Dechlorination Requirement

| Experiment | Dechlorination Requirement Equivalence Concentration C (½ Cl$_2$) in mol/l | Dechlorination NAHSO$_3$ mol/l | Dechlorination H$_2$O$_2$ mol/l | Filter Cake Solids Content | Filter Cake Consistency |
|---|---|---|---|---|---|
| 15 | $10 \times 10^{-3}$ | $5 \times 10^{-3}$ | — | 64.56 | rigid |
| 16 | $14.6 \times 10^{-3}$ | $5 \times 10^{-3}$ | $2.3 \times 10^{-3}$ | 64.03 | rigid |
| 17 | $19.8 \times 10^{-3}$ | $5 \times 10^{-3}$ | $4.9 \times 10^{-3}$ | 64.19 | rigid |
| 18 | $21.2 \times 10^{-3}$ | $5 \times 10^{-3}$ | $5.6 \times 10^{-3}$ | 64.36 | rigid |
| 19 | $25.2 \times 10^{-3}$ | $5 \times 10^{-3}$ | $7.8 \times 10^{-3}$ | 64.04 | rigid |

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is as follows:

1. A process for preparation of a titanium dioxide aqueous suspension, comprising the steps of
   (a) dispensing titanium dioxide in an aqueous liquid to form a slurry having a maximum pH of about 4;
   (b) reducing chlorine and reducible chlorine compounds in the slurry by adding a dechlorinating agent selected from the group consisting of at least one of hydroxyl ammonium chloride, hydrogen peroxide and sodium hydrogen sulfite in an amount which controls the multivalent anion content of the slurry sufficient to obtain, after the slurry is filtered in step (c), one of (i) a rigid filter cake with a solids content below about 60% by weight by controlling the content of multivalent anions in the slurry to about $5\times10^{-3}$ mol/liter or (ii) a thixotropic filter cake with a solids content above about 65% by weight by controlling the content of the multivalent anions in the slurry to less than about $3\times10^{-3}$ mol/liter; (c) filtering the slurry from step (b) to form a filter cake; and (d) thereafter rendering the filter cake flowable to form the titanium dioxide suspension.

2. The process according to claim 1, wherein step (b) includes a dechlorinating agent which introduces multivalent cations into the slurry.

3. The process according to claim 1, wherein the step of filtering comprises a pressure filtration apparatus.

4. The process according to claim 1, wherein the filter cake is rendered flowable by shearing.

5. The process according to claim 1, wherein the filtering step comprises a vacuum filtration on a Moore filter.

6. The process according to claim 1, wherein the dechlorinating agent is a combination of hydrogen peroxide and sodium hydrogen sulfite.

7. The process according to claim 6, wherein addition of the hydrogen peroxide takes place before addition of sodium hydrogen sulfite.

* * * * *